(12) United States Patent
Rush et al.

(10) Patent No.: US 8,917,269 B2
(45) Date of Patent: Dec. 23, 2014

(54) TWO DIMENSIONAL DISPLAYS, TRANSPARENT DISPLAYS, AND THREE DIMENSIONAL DISPLAYS

(76) Inventors: Andrew William Rush, Gulfport, FL (US); Devin Clark Phillips, Jacksonville, FL (US)

(*) Notice: Subject to any disclaimer, the term of this patent is extended or adjusted under 35 U.S.C. 154(b) by 553 days.

(21) Appl. No.: 13/189,463

(22) Filed: Jul. 22, 2011

(65) Prior Publication Data

US 2012/0139903 A1 Jun. 7, 2012

Related U.S. Application Data

(60) Provisional application No. 61/366,974, filed on Jul. 23, 2010, provisional application No. 61/430,946, filed on Jan. 7, 2011.

(51) Int. Cl.
*G06T 15/00* (2011.01)
*G02B 6/27* (2006.01)
*H04N 13/04* (2006.01)
*G02F 1/01* (2006.01)
*G02F 1/1335* (2006.01)

(52) U.S. Cl.
CPC ...... *G02F 1/133615* (2013.01); *H04N 13/0434* (2013.01); *G02F 1/0136* (2013.01); *G02F 2001/13355* (2013.01)
USPC .......................................... 345/419; 359/362

(58) Field of Classification Search
CPC ................ G02F 2001/13355; G02F 1/133615; G02F 1/0136
USPC .......................................................... 345/419
See application file for complete search history.

(56) References Cited

U.S. PATENT DOCUMENTS

| | | | | |
|---|---|---|---|---|
| 5,115,305 A | * | 5/1992 | Baur et al. | 348/751 |
| 5,764,403 A | | 6/1998 | Downing | |
| 6,762,801 B2 | | 7/2004 | Weiss et al. | |
| 6,839,181 B1 | * | 1/2005 | Cobb et al. | 359/634 |
| 7,158,095 B2 | | 1/2007 | Jenson et al. | |
| 7,821,388 B1 | | 10/2010 | Booth et al. | |
| 8,619,363 B1 | * | 12/2013 | Coleman | 359/576 |
| 2008/0117491 A1 | * | 5/2008 | Robinson | 359/237 |
| 2009/0167966 A1 | | 7/2009 | Nam | |
| 2010/0002175 A1 | | 1/2010 | Kim | |
| 2010/0052523 A1 | | 3/2010 | Kim | |
| 2010/0053044 A1 | | 3/2010 | Lee | |
| 2011/0019112 A1 | * | 1/2011 | Dolgoff | 349/8 |

* cited by examiner

*Primary Examiner* — Kee M Tung
*Assistant Examiner* — Yuehan Wang
(74) *Attorney, Agent, or Firm* — Andrew Rush; PCT Law Group

(57) ABSTRACT

The present disclosure describes a display apparatus for displaying two and three dimensional images and video. In some embodiments, the display is at least partially transparent, allowing the viewer to receive visual information from the display and see objects and the environment behind the display apparatus.

4 Claims, 6 Drawing Sheets

Light from light source

TWO DIMENSIONAL DISPLAYS, TRANSPARENT DISPLAYS, AND THREE DIMENSIONAL DISPLAYS

CROSS-REFERENCE TO RELATED APPLICATIONS

This application claims the benefit of U.S. Provisional Patent Application No. 61/366,974, filed 23 Jul. 2010, and entitled "Edge Illuminated Transparent Display with Polarization Rotating Elements" and U.S. Provisional Patent Application No. 61/430,946, filed 7 Jan. 2011, and entitled "2D displays including transparent displays and 3D displays", the entire contents of which are incorporated herein by reference.

TECHNICAL FIELD

The present disclosure relates generally to displays and more particularly to transparent display panels. It also relates to two- and three-dimensional displays.

BACKGROUND

This disclosure is related to displays that may be used to display 2D or 3D static or moving pictures or video. In some embodiments, the display is digital and/or pixel-based and the images displayed are monochromatic or full color. The object of this invention is to create a display suitable for computers, televisions, or any other device requiring or enhanced by a mechanism of text, picture and video display. In some embodiments this display is at least semi transparent, that is, the display allows some ambient light to pass through the display to the viewer. This transparency will allow information to be sent to the viewer, without completely impairing their view of the surrounding environment, including the environment directly behind the device. Another object of this invention is to combine into a single form factor which resembles current LCDs all the elements necessary for a transparent display. Current transparent display systems are bulky because they require a projector some distance away from a transparent projector surface. The requirement of having a projector some distance away from the viewscreen makes it difficult to use such devices from being used in areas where space is at a premium, and also prohibits the use of transparent screens in the place of LCDs without redesigning the entire device to accommodate a projector. The current invention avoids these problems, because it does not require significantly more space than an LCD of similar display size. The present invention will be described more fully with reference to the accompanying drawings, in which preferred embodiments of the invention are shown. This invention may however be embodied in many different forms and should not be construed as limited to the embodiments set forth herein.

SUMMARY

By way of introduction only, an embodiment of the present invention comprises four components: (a) polarization modifying elements (PMEs), (b) polarization selective reflective surfaces (PSRSs), (c) light source(s), and (d) controlling electronics. In one embodiment, (a) is a liquid crystal cell, of which hundreds of millions a year are produced at low per unit cost. In one embodiment, (b) is a thin film polarizer which is produced using a low cost substrate, coated using the same process that produces antireflection coatings for prescription eyeglasses. There are a variety of well known ways to produce low cost, high-volume light sources (c). Finally, in one embodiment, the controlling electronics (d) do not need to differ significantly from the electronics used in existing LCDs, which are also produced at very high volumes at a low cost. The preceding cost and availability factors make this invention preferable to transparent displays with utilize OLED technology, because OLED production capacity is very low compared to liquid crystal cell production, and much more costly. Other systems, methods, features, and advantages contained or implied by this disclosure will be or become apparent to one with skill in the art upon examination of the following figures and detailed description. It is intended that all such additional systems, methods, features, and advantages be included within this description, be within the scope of the disclosure, and be protected by the accompanying claims.

DETAILED DESCRIPTION

Figure 1:
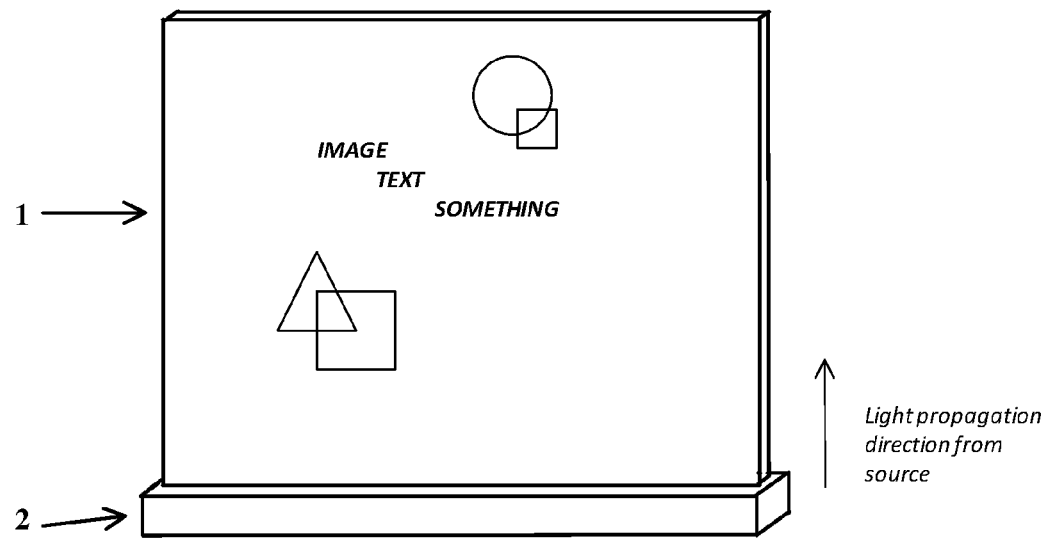
FIG. 1 is a perspective view of the apparatus in accordance with the present disclosure, display images and text.

This disclosure related to display apparatus that may be used to display 2D or 3D static or moving pictures or video. In some embodiments, the display is digital and/or pixel-based and the images displayed are monochromatic or full color. As shown in FIG. 1, in one embodiment, the display apparatus comprises a light source 2 and a display area 1. The display area 1 may be any desired size. For the embodiment depicted in FIG. 1, the viewer of the display is looking directly into the page. In some embodiments, the display area 1 is comprised of transparent or partially transparent elements configured such that the view can see information being displayed on the display apparatus and can also see objects behind the display apparatus which would be otherwise blocked if the display apparatus did not contain such elements. The light source 2 emits the desired light (one color, or more depending on the application). In some configurations, this source 2 is oriented so that it provides edge illumination of the display, in other words the light from the light source 2 enters the display area 1 along the display area's smallest side. Depending on the embodiment, the light source is placed on any edge of the display. Some embodiments use light sources 2 on multiple sides.

In one embodiment, in order to control the amount of light available for each pixel, the light source 2 is collimated. Collimation is achieved using techniques including but not limited to using a laser light source, lens arrays with optical fibers placed near the focal point of the lens array, cylindrical lenses, GRIN lenses, or some other combination of lenses and light sources, including but not limited to LEDs, CCFLs, and arc lamps. In one embodiment, the light source(s) 2 are precisely held at the proper distance and position from the lenses/optical system in order to produce the desired collimation of light. In some embodiments, the light source(s) 2 is held at this distance and position using a rigid frame, preferably constructed of plastic, in order to keep its cost low while retaining the option to relatively quickly produce large volumes of the part.

Figure 3:
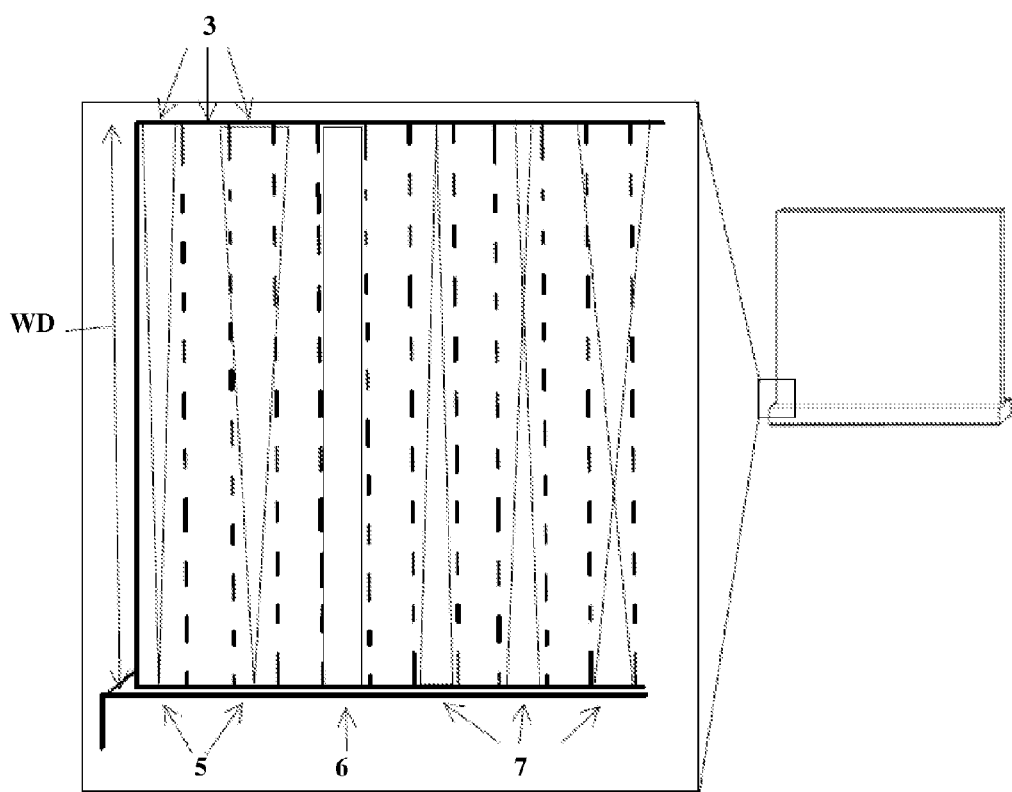
FIG. 3 is a detail view of the apparatus in accordance with the present disclosure, depicting several configurations of light from the light source.

As shown in FIG. 3, in some embodiments, the light source 2 is divergent and the precise amount of divergence is known. For example, if the light source 2 has a Gaussian output, and a divergence angle of 2 degrees in the plane of the display (as created by, for example, a series of cylindrical lenses) one can model how much light is available to pixels in the subsequent row from the previous row, using relatively simple, known-in-the-art calculations.

Figure 2:
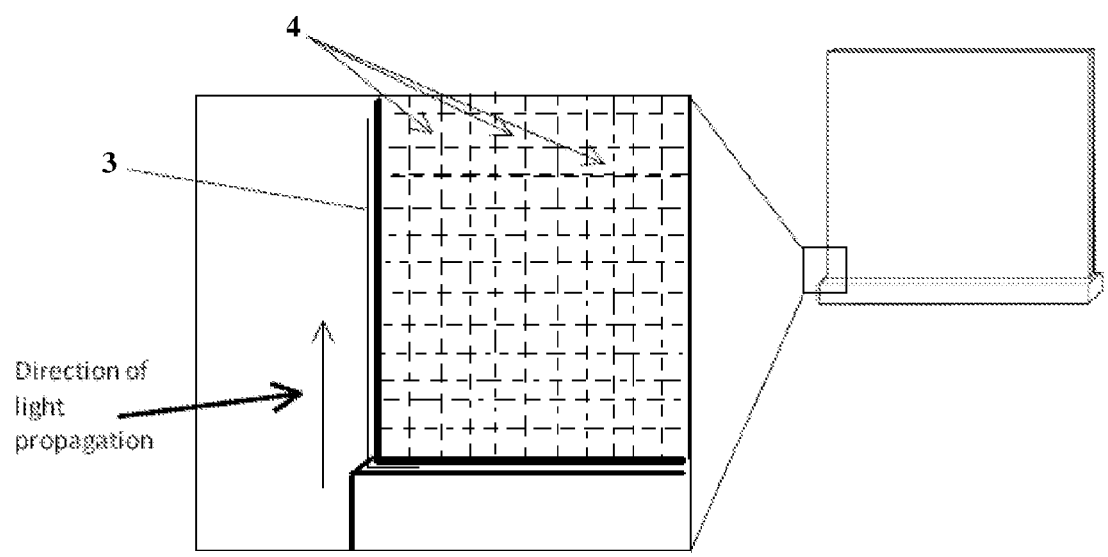
FIG. 2 is a detail view of the apparatus in accordance with the present disclosure, depicting one configuration of pixels in a representative display.

In some embodiments, there must be a mechanism to determine the amount of light available to each pixel. Depending on the application, this data is previously calculated, or calculated on the fly. The previously mentioned collimation is required in some embodiments in order to keep track of the light available to each pixel. In some embodiments, such as the embodiment depicted in FIG. 2, the pixels 4 are arranged in a normal square grid. In some embodiments, the light source illuminates the pixels 4 in columns 3, so the amount of light available is determined by the how much light was reflected to the viewer by the previous pixels 4 in the column 3.

FIG. 3 is a detail view of the possible light paths 5, 6, 7 that could be taken in a representative display apparatus. In some embodiments which utilize collimation, a limiting factor regarding the size of the display panel is the working distance (WD) of the light source.

The "working distance" is defined as the distance the light from the light source 2 in one column of pixels 3 can travel before diverging so much that the light leaks into an adjacent column of pixels 3. In some embodiments, determining the amount of light available becomes difficult once the light leaks into the adjacent pixel column 3. In some embodiments, the light available from pixel to pixel determines the signals sent to the display from the controlling electronics. In some configurations, a way to determine the light available is to restrict the light available for a given column of pixels 3 by making it collimated 6. In some embodiments, light from the light source(s) 2 is convergent 7 or divergent 5.

Where a pixel layout is utilized, the pixel 4 is comprised of some mechanism to selectively alter the polarization of incoming light and some mechanism to reflect light of a certain polarization and transmit light of another polarization. In one embodiment, each pixel 4 is comprised of a polarization modifying element (PME) 8 and a polarization selective reflective surface (PSRS) 9 placed at some angle relative to the PME 8 in order to direct light to the viewer. FIG. 9, shows a detail view of an embodiment arranged in such a fashion. The dashed lines represent the pixel columns 3. These intersect with the solid black lines which represent PMEs 8. Here, the PMEs are layers of TN-type liquid crystal cells. These PMEs 8 are divided into sections the same width as the pixel columns 3, an each section is controlled independently, so that the PME 8 of each pixel 4 may be addressed to provide the desired brightness and color (where applicable). PSRS 9 layers are placed in between the PME 8 layers, forming pixel row assemblies. These layers should be oriented so that light from the light source 2 may reflect off of them toward the viewer's position when the light has the correct polarization to be reflected. Here the viewer is in the same position as a person reading this page, so the PSRS 9 layers are angled at 45 degrees, so the image comes straight out of the page (or perpendicular to the display area 1). This angle may be altered if the viewer is in a different location, or for some other reason apparent to those skilled in the art. The PME 8 layers and PSRS 9 layers can be held together by glass or some other substrate, to provide structural support while maintaining transparency. In some embodiments, this substrate must be polarization maintaining (non-birefringent).

Depending on the embodiment, the PSRS 9 and PME 8 are parallel or separated by any non-90 degree angle. In some embodiments, this PSRS 9 reflects one polarization of light, and allows other polarizations to pass through. In some configurations, the materials making up the PMEs 8 and PSRSs 9 are transparent, so that some or all of the ambient light may pass through unaffected, enabling the viewer to see through the display. In some embodiments, these materials are transparent/semi-transparent in the axis the light from the light source propagates, so that light may pass through each pixel in a pixel column 3.

Figure 4:
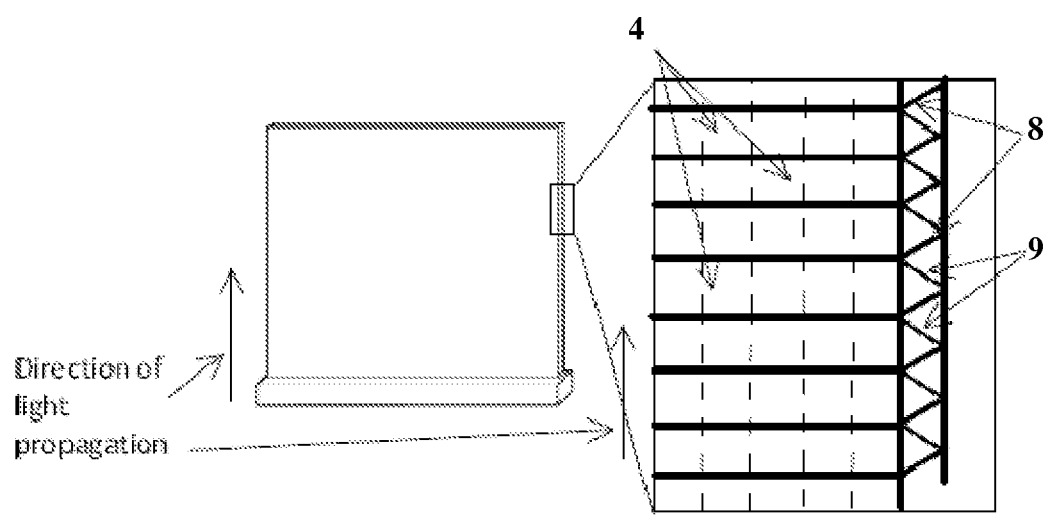
FIG. 4 is a detail view of the apparatus in accordance with the present disclosure, depicting a layout of the pixel row assemblies.
Figure 5:
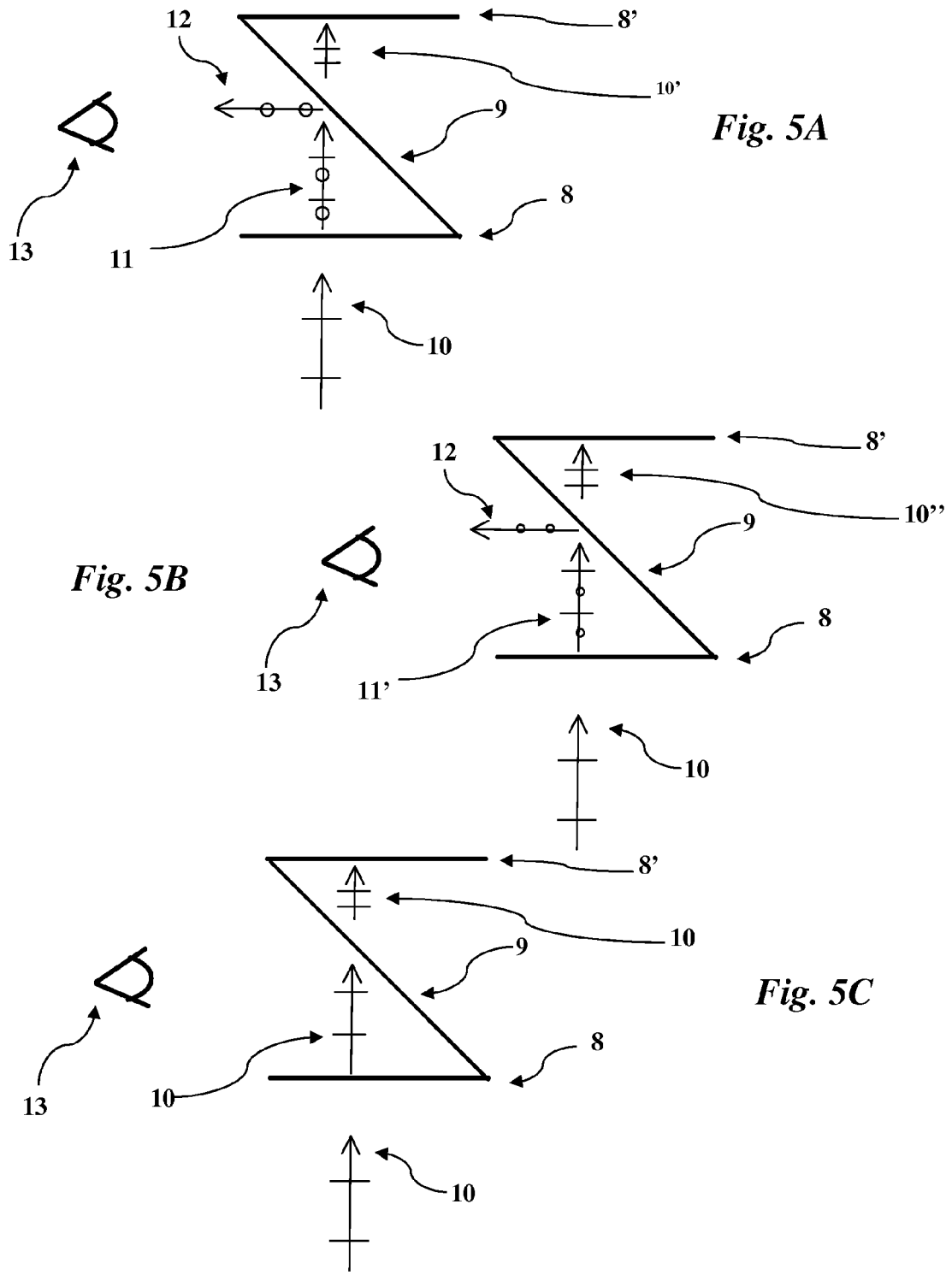
FIGS. 5A-C depicts schematic layouts of the functionality of one embodiment of pixel arrangements in the present disclosure.

As shown in the embodiment depicted in FIGS. 4 and 5, light enters each pixel row assembly from the surface where the PME 8 is located. In one embodiment, based on the pattern that the screen will be displaying, a voltage is sent to the PME 8 which causes the PME 8 to rotate the polarization of the incoming light between 0 and 90 degrees, based on the magnitude of the signal sent from the controlling electronics. Due to the vector nature of polarization, one can visualize the polarization of a light ray as being broken into two components that are orthogonal to one another, and x-axis component, and a y-axis component. In the field of optics it is common to refer to these components as the s- and p-polarizations. S-polarization 12 is defined as the condition where the electric field vector (of the light wave) is perpendicular to the plane of incidence. P-polarization 10 is defined as the condition where the electric field vector is parallel to the plane of incidence. The polarization of the light in this disclosure shall be referred to in these terms. After the light has passed through the PME 8, it is incident on a PSRS 9 which, depending on its configuration, will reflect p-, s-, or some other polarization of light, and allow light polarized orthogonally to this light to pass through freely.

In one embodiment of the disclosed apparatus, monochromatic light, or white light (as from a blue or white LED light source 2) enters the PME 1 as p-polarized light 10 and the PSRS 9 is set up to reflect s-polarized light 12. FIGS. 5A-C schematically represent this. The PME 8 in this example is designed to rotate the light between 0 and 90 degrees, or between completely p-polarized 10 all the way to completely s-polarized 12. Depending on the signal sent to the PME 8 in the example, the p-polarized 10 incident light will be unaffected 10, or be reduced in magnitude, with some s-polarized light created 11', 11. This s-polarized light 12 will be reflected off the PSRS 9, which in some embodiments is oriented so that the light is reflected toward the viewer 13. This intensity is controlled based on the signal sent to the PME 8, so that the desired brightness is sent to the viewer. The remaining p-polarized light 10' passes onto the next pixel row assembly via the subsequent PME 8'.

In another embodiment, the pixel in the above example is part of an additive color display (such as an RGB-based display) an each pixel 4 is divided into three subpixels, with red, blue, and green light incident, one color for each subpixel. By adjusting the amount of light reflected by each subpixel-PSRS 9 combination, the pixel 4 generates a broad spectrum of colors, enabling a display made up of such pixels to be full color.

In other embodiments the PMEs 8 rotate the light between −90 and +90 degrees, −10 and +80, −45 and +90 degrees, etc.

In some configurations, the PMEs 8 are transparent to visible light so that light from the light source can pass through it to other pixels 4, having its polarization modified as needed and passing light to the next pixel in its column 3. PMEs 8 are made of a variety of materials including, but not limited to liquid crystal (LC) cells or Verdet active materials. In an embodiment where a Verdet active material is used, a mechanism is used to generate a magnetic field strong enough to cause the Verdet active material to rotate the polarization of the light incident on the PME 8 the desired amount. Types of LC cells used include, but are not limited to, twisted nematic (TN), super twisted nematic (STN), and in-plane switching (IPS).

The PSRS 9 is constructed of a variety of materials, depending on the embodiment. In some embodiments, the PSRS 9 elements are generally transparent to visible light, but reflect one polarization of light, transmitting polarizations orthogonal to that polarization. Materials used include but are not limited to, reflective polarizers, dielectric materials placed at Brewster's Angle, Macneille polarizers or other pile-of-plates polarizers, wire grid polarizers, etc. In one embodiment, the axis of transmission of the PSRS 9 is parallel to the polarization angle of the collimated light from the light source, as in FIG. 5A-C.

These pieces are constructed in a variety of fashions. In the embodiment depicted in FIG. 5 (involving LC cells and PSRSs at a 45 degree angle), the PME layers 8 and PSRS layers 9 are separate, self contained pieces placed into a suitable frame. The PMEs 8 in this embodiment are controlled by sending voltages to individual LC segments. The connections (usually a flexible printed circuit (FPC), which is not generally transparent) to facilitate this control are arranged to come off the small sides of the LC PME 8. In other embodiments, a transparent connection scheme is used using materials such as transparent ITO contact pads on the edges of the LC-PME 8, and intermediate pieces of glass, with ITO wires imprinted on it, that is in contact with these ITO contact pads. This allows the interconnection of LC cells, to form an active matrix TFT-LC PME network. In other embodiments, the ITO wires lead down to the electronics control unit in a separate fashion. Embodiments using this, and the FPC connection arrangement, optionally allow directly addressing each LC segment. In some embodiments the frame which holds all these pieces together is rigid.

Figure 6:
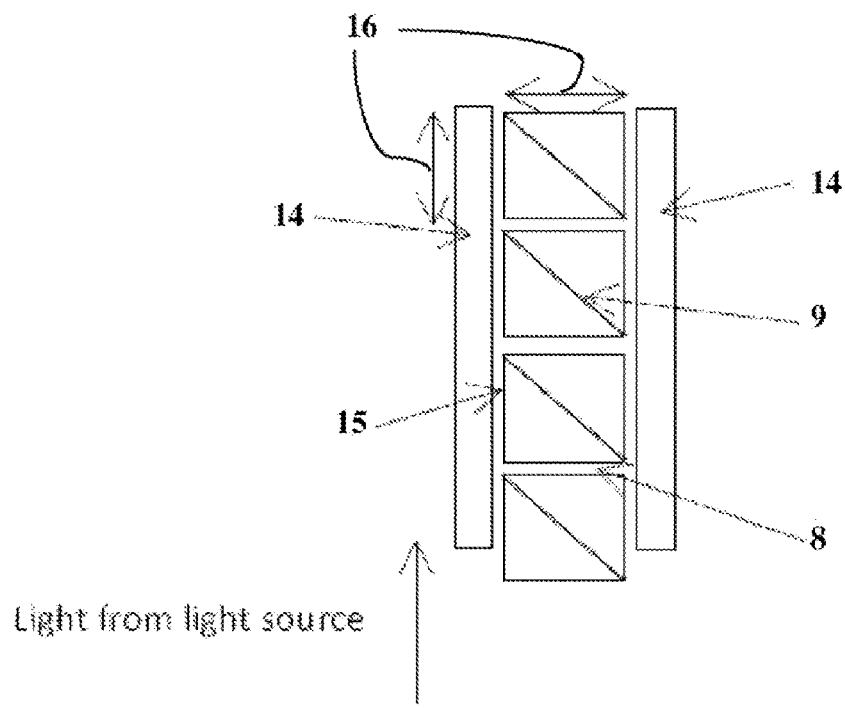
FIG. 6 depicts a side view of the apparatus in accordance with the present disclosure.

Another construction scheme is pictured in FIG. 6. Construction starts with a substrate 14 (glass, for example). In some embodiments, this substrate is slightly larger than the desired display area 1. PSRSs 9 are constructed by placing the PSRS 9 active material such as thin film polarizer on a prism substrate 15. The prism 15 is cut within the acceptance angle of the PSRS 9 (for example, 45 degrees). The prism is as wide 16 as the pixel 4 it will display or the active area of the LC-PMEs 8. This is then bonded to another prism 15 of the same dimension, forming a rectangular prism, of length equal to the width of the display area and sides equal to the width 16 of the pixels or active area of the LC-PMEs 8. These prisms 15 have the ITO that is normally printed on LC cells to activate LC segments printed on the sides of the prisms 15 that will be in the light path of the light source 2. These ITO segments, or some other suitable mechanism for addressing the LCs, are connected by some mechanism to the controlling electronics, and used to control voltages to LC-PMEs 8. The prisms 15 are bonded to the previously mentioned pane of glass 14, using, for example, an optically transparent gasket. A space, equal to the space in between panes of glass in an LC cell, is left between the prisms. This is accomplished through careful placement, physical spacers, or other appropriate method. Liquid crystal is then injected in the spaces between the PSRS prisms 9, 15, and aligned, so that they form (combines with the ITO segments on the PSRS prisms) a functioning LC cell. A second substrate 14 is placed on the other side of this combination, and bonded to the PSRSs 9 with an optically clear gasket, in order to contain the liquid crystal.

In some embodiments, a non-zero percentage of light is lost at each interface because of absorption, diffraction, etc. In one embodiment, a high definition version of this display may have hundreds to a thousand or more pixels, per pixel column. As seen previously, in embodiments utilizing pixels comprising a PME 8 and a PSRS 9, each pixel 4 will have at least two interfaces that the light must pass through/interact with. In some embodiments it is preferable to take special care to choose PSRSs 9 and PMEs 8 that will transmit high percentages of light from the light source 2, so that pixels 4 further down the line can have higher available brightness levels, and the possible contrast levels will be higher. In some embodiments, reducing the number of interfaces while maintaining pixel count, one increases available light, and/or increases the available contrast ratio.

Figure 7A:
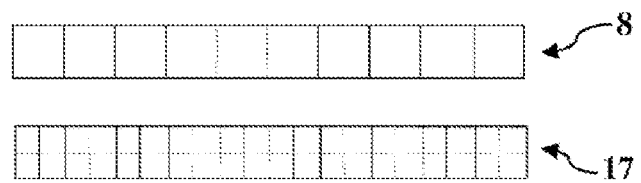
FIGS. 7A-B depicts schematic views of how alternative configurations of the apparatus in accordance with the present disclosure function.
Figure 7B:
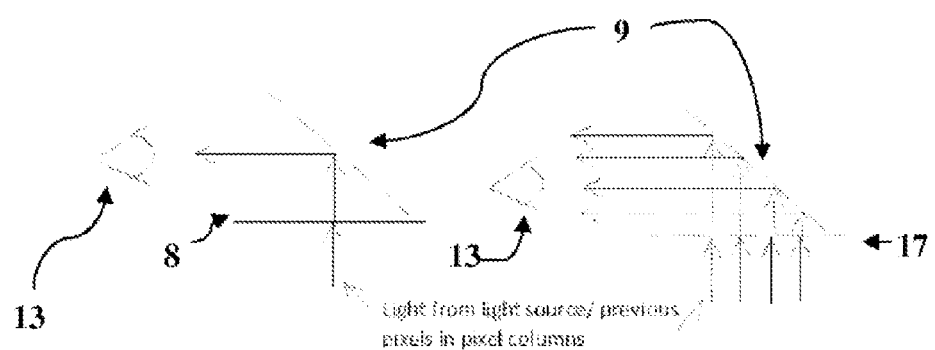

In some embodiments, multiple pixels 4 are displayed on the same PSRS strip 9 by having the PMEs 8 be wider than one pixel 4. A schematic view of this is depicted in FIGS. 7A and 7B. The PME 17 is set up so that it addresses multiple pixels 4 along the PME width as well as the PME length. For example, a PME 8 that it 10 mm wide and 160 mm long can only address 16 10 mm a side square pixels. However that same area can be used to address 1600 1 mm a side square pixels where the PME 17 is designed to have 1 mm-a-side active segments, instead of 10 mm-a-side active segments. This arrangement has 100 pixels for every one pixel in an arrangement where the configuration previously had only 1, or a 100:1 arrangement. FIG. 7A contains a depiction of an illustration of a 4:1 arrangement embodiment. In another embodiment where the pixels 4 are already of a desired size, the PME 17 is expanded length-wise to address additional rows of pixels 4. The light source 2 is also expanded in width in order to illuminate these additional rows.

FIG. 7B depicts a side view of one embodiment, showing a PME 17 addressing multiple pixel rows. In addition to reducing parasitic light loss from passing through many interfaces, this setup simplifies the calculations required for determining how much the polarization of light should be altered at each PME 8, 17 in order to display the desired image for the viewer 13. Pixel columns 3 in this scenario will be made up of every nth pixel 4, where n=the number of pixels addressed per width of each PME 8. For example, in the 4:1 PME 17 depicted in FIG. 7A-B, 2 pixels 4 are addressed per width, therefore a pixel column 3 (where all pixels are in the same light path of the light source, using the same light to generate an image for the viewer) will address every 2nd pixel in the apparent pixel column 3 seen by the viewer (the entire pixel column displayed to the viewer).

Embodiments may create color through additive or subtractive color practices. In one embodiment, the light source 2 emits a generally constant amount of light. For one color, this light is the desired color. For a full-color display, the light source 2 emits smaller, collimated sources of the required constituent colors. In one embodiment, these small sources of light 2 are arranged so that each pixel column 3 will have a collimated source of each color. For example, where a display is based on RGB, additive color principles, the light source 2 emits red, green, and blue light. In one such an embodiment, this light is oriented so that each light column has a sub-column of red, green, and blue light. Alternatively, the light source 2 uniformly emits light over all wavelengths, or an appropriate range of wavelengths (emitting at red, green, and blue wavelengths for example) and a color filter is placed over the light source 2 to allow only the appropriate wavelengths of light through. It some embodiments, it is preferable for the color filter to mimic the layout of the subpixel columns 3, so that each subpixel column 3 receives its appropriate color.

In an embodiment where the PSRS 9 material has an operating wavelength range that includes the emission spectra of the constituent colors used in a color display a single PSRS 9 can be used, because it will reflect and transmit the desired amounts of p-10 and s-12 polarized light. Some PSRSs 9, such as some thin-film polarizers do not operate (reflect s-polarized light and transmit p-polarized light with high efficiency) over the entire visible spectrum, therefore for some embodiments it is necessary to apply different PSRS materials to each PSRS piece 9, aligned with each color light path from the light source. In some embodiments the color sources in the light sources are arranged as strips. This allows the corresponding PSRS 9 material to be laid down as a strip, or assembled from multiple thinner pieces. For narrow operating wavelength PSRSs 9, the PSRS material may be laid down in any acceptable manner for the given application.

In some embodiments, using different geometries for the PSRS 9 improves the viewer's viewing angle. Some embodiments of this invention utilize a PSRS 9 that has a planar surface. This does not have to be the case. PSRSs 9 are constructed with non-planar geometries in some embodiments, such as curved, hemispherical, or rough surfaces.

One embodiment of a PSRS 9 has a surface which resembles a piece of paper, held on opposing sides and bowed out in the middle. Such a surface is curved in only one axis, along the entire length of the pixel row(s). In one embodiment, it is convex, curving out toward the direction the light is reflected. Here, the viewing angle will be improved in the vertical direction. In some embodiments, the rate of curvature is not constant. The curvature is non-constant and calibrated in order to provide the most consistent light distribution in the x- and y-axes. In some embodiments, a curved PSRS 9 limits the type of material that can be used for the PSRS 9. Some reflective polarizers have very narrow acceptance angles. Outside this acceptance angle, the reflective polarizer may not separate s-12 and p-polarizations 10 as cleanly as required (some s-polarization 12 is transmitted). In order to spread the light out by the maximum amount, some configurations curve the PSRS 9 as much as possible, with the PSRS 9 consistently performing over all the angles created by the curvature. In some embodiments, it may be preferable that the design of a non-planar PSRS 9 take into account a geometry's affect on the propagation of light through pixel columns 3 and the image ambient light passing through the PSRSs 9 present to a viewer, in order to ensure that the geometry does not render the screen non-operative because there is not enough light throughput, or that transparency and a clear, non-distorted image still exists, if that is desirable for the specific application.

Depending on the configuration of the display, such curved PSRSs 9 are constructed in a variety of ways. Traditional methods of constructing plastic or glass optics are used, since these pieces are essentially single small optical elements. Where the PSRS 9 material is a flexible film, it is secured at its ends in a manner that bends the film to the desired shape. In other configurations, Such a film is bonded to a suitable (no- or low-birefringence) substrate, using optically clear adhesive or similar bonding technique. In this way, the substrate is manufactured with the desired curvature, before the application of the PSRS 9, which may be sensitive to the temperatures or techniques used to manufacture the substrates efficiently and cost effectively. Curved thin film polarizer-based PSRSs 9 are produced in a similar fashion. The substrate is first formed in this way, and then the thin film is be applied through vacuum deposition, ionic beam sputtering, or other method of applying thin films.

A hemispherical PSRS 9 is another embodiment of a viewing angle improving PSRS 9 geometry. In one embodiment, the PSRS 9 surface is curved for each pixel 4 in the pixel row 4. It is convex and curved in the x- and y-axes (where the y-axis is the direction of light propagation, and the x-axis is in the direction defined by the direction of the pixel rows). It can range from almost planar, to as curved as an eighth of a sphere, or more. This reflects the light out in an angle in both the x- and y-axes. In some embodiments, the same principles of design and construction for curved PSRSs 9 apply to hemispherical PSRSs 9. Depending on configuration, the rate of curvature is non-constant and/or designed in a manner that will reflect the most consistent amount of light desired for the specific embodiment.

A rough surface PSRS 9 also improves the viewing angle of the disclosed apparatus by dispersing light reflected out of the pixel column 3 over a broader angle that a planar surface would. Here, the surface of a substrate has been roughened to provide small flat surfaces at a variety of angles. Some embodiments are roughened randomly, others have specific pieces cut out of it, to create specific surfaces at set angles. The PSRS 9 material is applied to this surface, so that light from the light source interacts with a variety of small surfaces that selectively reflects s-polarized 12 light at a variety of different angles. In some embodiments, it is easier to insert such a PSRS 9 for assembly than one with a more complex surface. Rough surface PSRSs 9 use an angle independent PSRS 9 material, like reflective polarizing film, or other PSRS 9 materials. Other embodiments use thin film polarizing films, whose acceptance angles are chosen to allow light from the light source to fall within its acceptance angle, based on the specific planar surface the thin film PSRS 9 is applied to. In some embodiments, this requires that the thin film polarizers be applied to the correctly cut areas. Such areas are planar in some embodiments.

Figure 8:
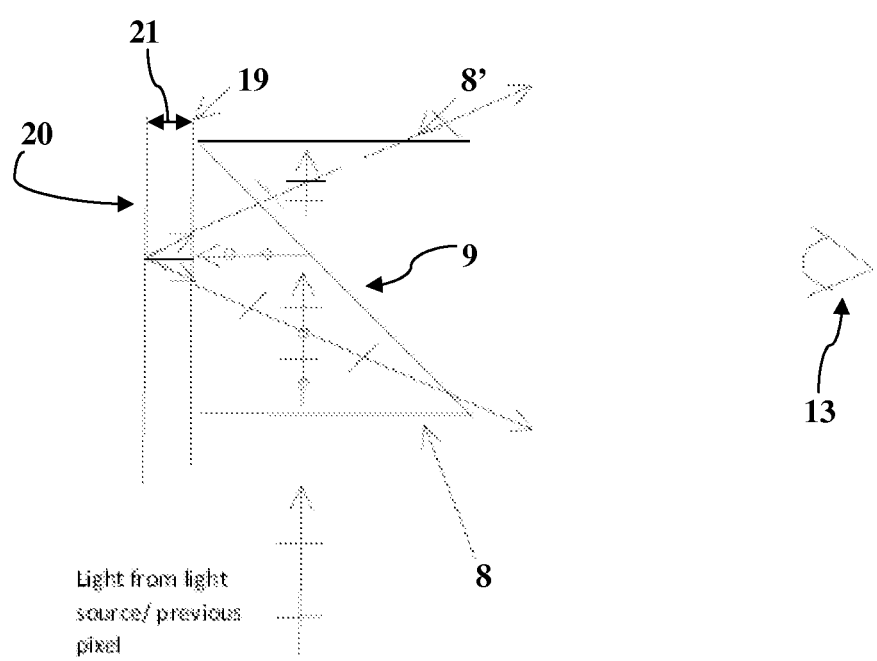
FIG. 8 depicts a side view of another apparatus in accordance with the present disclosure and an alternative viewing position.

In some embodiments, the viewing angle is improved through the use of transparent holographic or diffusion films or similar mechanism 20. Any suitable mechanism for scattering light, while maintaining its polarization, is suitable for this embodiment. In other configurations, the scattering mechanism 20 is at least partially transparent. FIG. 8 shows a side view layout of an embodiment of a reverse projection embodiment of this subject display apparatus. Here, the retarder layer 19 and holographic film 20 are shown in a somewhat exploded view so it is clear that the reflected light from the PSRS 9 passes through the quarterwave film 19 and is reflected off the scattering means 20. Here, it is necessary for the PSRS 9 to transmit p-polarized 10 light that is incident on the PSRS 9 at a variety of angles. For example, in an embodiment where light enters through the PME 8, which alters the polarization of the incoming light in order to convert the desired amount of light needed for the image to be displayed into a polarization that will be reflected off the PSRS 9. In one embodiment, instead of this light traveling to the viewer, it then passes through a retarder layer 19, such as a quarterwave film or other mechanism for converting the linearly polarized light into circularly polarized light. The fast axis of the retarder layer 19 is set at a non-zero angle relative to the polarization angle of the linearly polarized light in order for it to create circularly polarized light. In some embodiments, this angle is 45 degrees. This retarder layer 19 is bonded to the aforementioned holographic material or other suitable mechanism for reflecting and scattering the light. The reflection will reverse the rotation of the circularly polarized light. This reflected light will pass through the retarder layer 19 again, which will convert the light back into a linear polarization, but it will be orthogonal to the original polarization that was reflected by the PSRS 9. This conversion occurs in the area labeled 21. This is the same polarization that the PSRS 9 transmits, therefore this reflected light, which has be scattered over a wide variety of angles, will pass through a PSRS 9 that transmits such a polarization over a broad range of incidence angles. This light will pass through the PSRS 9, to the viewer, as shown. In some embodiments, this layout will create a near uniform brightness within the viewing angle of the scattering mechanism 20. These films are attached to the screen by any ordinary mechanism including optically bonding, or other adhesives, or physical restraining mechanism. Some scattering mechanisms 20 are rigid and therefore used as part of the physical support for the screen itself.

Another mechanism for increasing the viewing angle of the disclosed apparatus is using an opaque or transparent rear projection film. In some embodiments, such a mechanism is placed in front or behind the screen (the front is defined as the direction the light is initially reflected toward, off the PSRS 9). Such films can be bonded by any ordinary mechanism to the front of the display, and will scatter the light from the screen over a greater viewing angle, greatly improving the viewing angle and reducing hot spots.

Another use of the subject invention is the production of stereoscopic 3DTVs. In some embodiments the 3D image is generated by having the display generate the 2 slightly different images necessary for one's brains to "see" a 3D image, and each image is made of polarized light with an orthogonal polarization. Such polarizations can be linear (s-12 and p-polarizations 10, for example), or they are left- and -right handed circular polarizations. For example, the light that generates the image intended for the viewer's right eye would be p-polarized 10, and the light intended for the viewer's left eye would be s-polarized 12. This allows the view to see 3D imagery by wearing polarized glasses which allow only the polarization of light intended for that eye to pass through the polarized (s-polarizer 12 over left eye, and p-polarizer 10 over right eye, or right- and left-handed circularly polarizers). This is advantageous over conventional, active-shutter 3DTVs because the viewer does not have to wear expensive active-shutter glasses, rather they can wear glasses comprised of simple polarizers. In some embodiments, this allows the price of the TV to be reduced, and allows consumers to easily purchase more pairs of glasses, so more people can enjoy 3DTV at the same time. The display here is not projector based, as some current polarization-based 3DTVs are, therefore this display has another advantage in that it requires less area to be deployed compared to a projection-based system. Additionally, this screen will constantly display both polarized images, therefore this display does not require the controlling software to alternate frames intended for the left and right eyes, as current displays must do. In some embodiments, images for both eyes are constantly produced.

In one embodiment the polarized 3DTV invention comprises 2 display assemblies of the subject disclosure, stacked one after the other. The back display emits its image using p-polarized light 10, where p-polarized light 10 is the light that will be transmitted by the PSRSs 9 of the front display. This will allow the back display to produce an image for one eye that will pass unaltered through the front display to the viewer, where their polarizing glasses will allow only one eye to see that image. The front display must produce its image (intended for the other eye) using orthogonally polarized light, here, s-polarized light 12. This light will then also be seen by only the eye it is intended for, due to the polarized glasses worn by the viewer. In some embodiments, it is preferable for the viewer to have the option to view 2D content on such a display. This is accomplished by syncing the images displayed on the two component screens of the display, turning one of the screens off so, or some other mechanism.

In another embodiment, arranged in a similar manner to the one described above, a retarder layer 19 is placed between the viewer and the display assemble which is oriented to convert the linearly polarized s-12 and p-polarized light 10 to circularly polarized light. The retarder layer is part of the display and optionally bonded to it by an appropriate means. In this embodiment, the viewer would wear glasses which would allow one polarization to be seen be each eye. For example, right-hand circularly polarized light would be seen by the right eye, and left-hand circularly polarized light would be seen by the left eye. The displays that produce such light would generate the appropriate image to generate 3D effects. In some embodiments, it is preferable for the viewer to have the option to view 2D content on such a display. This is accomplished by syncing the images displayed on the two component screens of the display, turning one of the screens off so, or some other mechanism.

In one embodiment, the display is manufactured by constructing one screen that emits p-polarized light to the viewer, another screen that emits s-polarized light to the viewer, and then stacking them, one behind the other, so that the light emitted by the one in back travels through the one in front. One must ensure that the pixels of the screens are properly aligned so that the images sent to the screens will appear correctly aligned for the viewer. If circularly polarized light is to be sent to the viewer, a retarder layer is placed in front of the front screen, with its fast axis oriented to create the required circularly polarized light, as discussed above.

In another embodiment, such a display is assembled by constructing 2 screens that emit s-polarized light to the viewer and stack them one-behind-the other, but to place a layer of liquid crystal or other mechanism for rotating the polarization of the light emitted by the rear screen 90 degrees, so that when it passes through the front screen it is p-polarized. In some embodiments, the polarization rotating mechanism here should constantly rotate the polarization, it is not necessary for it to be able to variably rotate the polarization. In some embodiments, the PMEs for the two screens are combined. In some of these embodiments the PSRS assemblies are combined by bonding them together with a polarization rotating mechanism in between them. If circularly polarized light is to be sent to the viewer, a retarder layer is placed in front of the front screen, with its fast axis oriented to create the required circularly polarized light, as discussed above.

Another embodiment is constructed by assembling two screens that emit the same polarization to the viewer, stack them one-behind-the-other, but rotating the rear screen 90 degrees around the axis parallel to the direction the light is emitted, so that the rear screen emits p-polarized light, relative to the front screen. This p-polarized light would pass through the front screen to the viewer.

3DTV embodiments can use the opaque viewing angle improvement described above, as well as the mechanism for reducing the number of PMEs per PSRS, and any other suitable improvements for single screens.

In another embodiment, a single screen is combined with a traditional LCD screen to create a polarization-based 3DTV. Here, the rear screen is simply replaced by an LCD, or other display, that emits a single polarization of light. This polarization is chosen so that it passes through the PSRS of the front screen. The front screen emits an orthogonal polarization, creating two images of different polarizations, which are seen by the viewer in similar manners to those described above.

The foregoing is offered primarily for descriptive purposes. Further variations and modifications that utilize the features disclosed herein and therefore fall within the scope of this disclosure will readily occur to a person having ordinary skill in the art.

We claim:

1. A display apparatus comprising:
   a polarized light source configured for providing edge illumination;
   a display area comprising at least one pixel row assembly positioned in the plane the light source is configured to emit light in, where the pixel row includes a polarization modifying element with a first side and second side, positioned to receive light emitted from the light source across substantially all of one side, modify the polarization of the light in response to a signal from a controller, said light leaving the polarization modifying element via the second surface in the direction the light was emitted from the light source and contacting a polarization selective reflective surface positioned to receive that light and angled such that the polarization selective reflective surface reflects light of a chosen polarization at a desired angle and transmits light of an orthogonal polarization in the direction the light was emitted from the light source;
   a computer controller for changing the amount the polarization modifying elements change the polarization of the incoming light based on the image to be displayed; and
   a retarder layer disposed on the side of the display area where reflected light is directed by the polarization selective reflective surface, configured to convert reflected light of a given first linear polarization into circularly polarized light, a holographic film disposed on the side of the display area where the reflective light is directed by the polarization selective reflective surface such that the retarder layer is disposed between the holographic film and the pixel row assemblies of the display area for reflecting the circularly polarized light such that the polarization is maintained and the polarization of the light will be modified to a linear polarization which is orthogonal to the first linear polarization when the light passes back through the retarder layer and the polarization selective reflective surfaces contained in the display apparatus are transmissive for the polarization orthogonal to the first linear polarization.

2. A display apparatus comprising:
   a polarized light source configured for providing edge illumination;
   a display area comprising at least one pixel row assembly positioned in the plane the light source is configured to emit light in, where the pixel row includes a polarization modifying element with a first side and second side, positioned to receive light emitted from the light source across substantially all of one side, modify the polarization of the light in response to a signal from a controller, said light leaving the polarization modifying element via the second surface in the direction the light was emitted from the light source and contacting a polarization selective reflective surface positioned to receive that light and angled such that the polarization selective reflective surface reflects light of a chosen polarization at a desired angle and transmits light of an orthogonal polarization in the direction the light was emitted from the light source; and
   a computer controller for changing the amount the polarization modifying elements change the polarization of the incoming light based on the image to be displayed;
   wherein the display apparatus is configured for displaying two dimensional and three dimensional images comprising a column of a first set of pixel row assemblies forming a first display area of a given area wherein the first display area generates an image consisting of a first single linear polarization of light and the polarization selective reflective surfaces contained in the first set of pixel row assemblies reflect the first single linear polarization and are at least partially transparent to light of a second linear polarization which is emitted from a second display device of the same display area disposed and given area disposed behind the first set of pixel row assemblies such that the image generated from the second display device passes through the first set of pixel row assemblies before reaching the viewer wherein light of a first linear polarization forms an image seen by one of the viewer's eyes and light of a second linear polarization forms an image seen by the viewer's other eye when the viewer has donned headgear configured to allow each eye to see select polarizations of light.

3. The display apparatus of claim 2, wherein the second display device is chosen from the group consisting essentially of a display apparatus of claim 2, an LCD monitor, a projection display, and an OLED display.

4. The display apparatus of claim 2, further comprising a retarder layer disposed on the side of the display apparatus where the image forming light is sent to the viewer, configured to convert the image forming light from linearly polarized light of two given, orthogonal polarizations to circularly polarized light of right and left-handedness.

* * * * *